United States Patent [19]

Jones

[11] 4,092,191
[45] May 30, 1978

[54] SPEEDOMETER SCALE CONVERSION KIT AND METHOD

[76] Inventor: Thomas L. Jones, 617-B Hibbard Dr., Chapel Hill, N.C. 27514

[21] Appl. No.: 837,463

[22] Filed: Sept. 28, 1977

[51] Int. Cl.² ............................................. G01P 1/08
[52] U.S. Cl. ......................................... 156/64; 35/39;
116/DIG. 47; 156/235; 156/250; 206/459;
206/575; 428/42
[58] Field of Search ................... 206/223, 575 X, 232,
206/459 X; 116/DIG. 47, 115.5; 35/39;
156/64, 235, 250; 428/42

[56] References Cited

U.S. PATENT DOCUMENTS 3,446,178  5/1969  St. Clair et al. ............. 116/DIG. 47
4,054,105  10/1977  Fegan ......................... 116/DIG. 47

*Primary Examiner*—Edward G. Whitby
*Attorney, Agent, or Firm*—B. B. Olive

[57] ABSTRACT

A speedometer scale conversion kit and method of utilization of the components of such kit comprises the present invention. The conversion kit is composed of a step-by-step instructional sheet, a decal card and a cardboard strip having printed guide indicia. The instruction sheet provides the step-by-step method for forming the cardboard strip into a ten kilometer gauge, using the gauge to measure off and mark ten kilometer spacings on the transparent face cover of the speedometer, and for then removing and placing the appropriate kilometer number decal on the premarked face of the speedometer.

4 Claims, 9 Drawing Figures

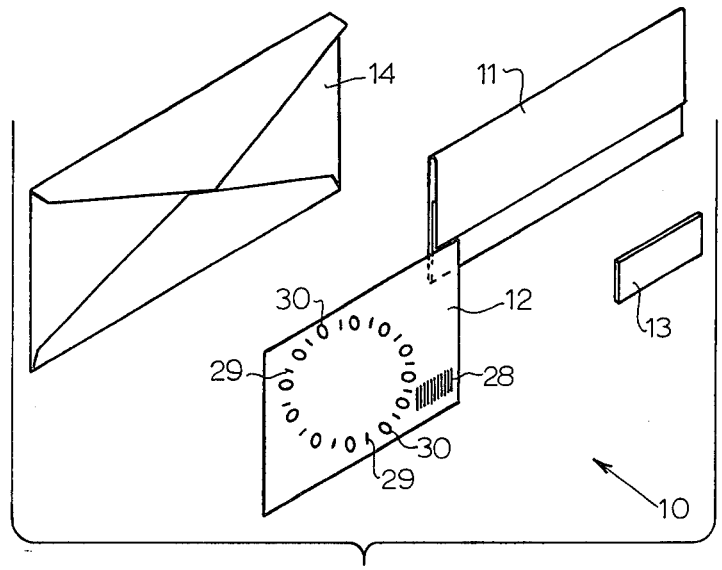
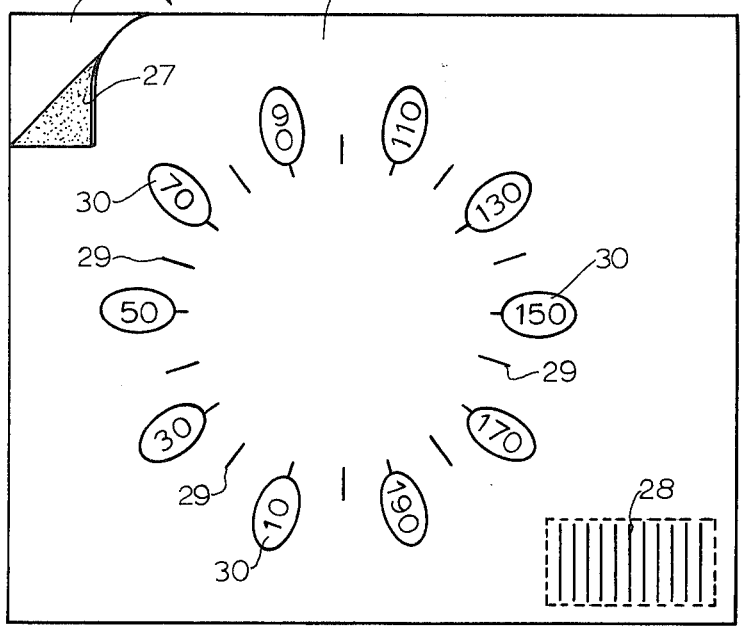
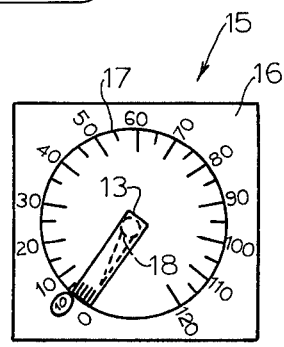
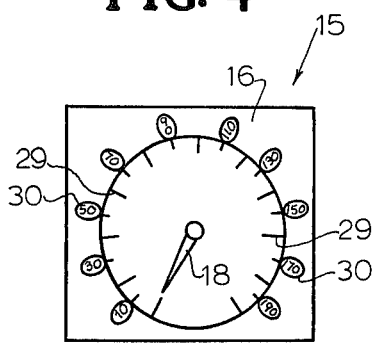
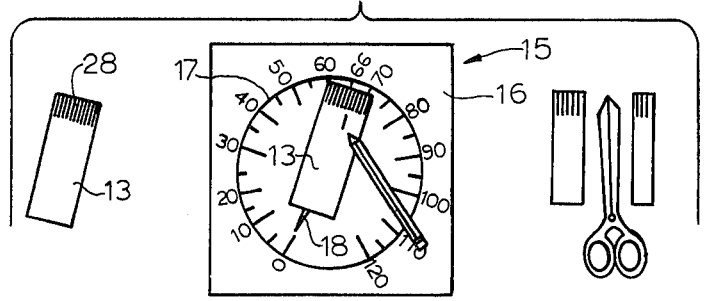

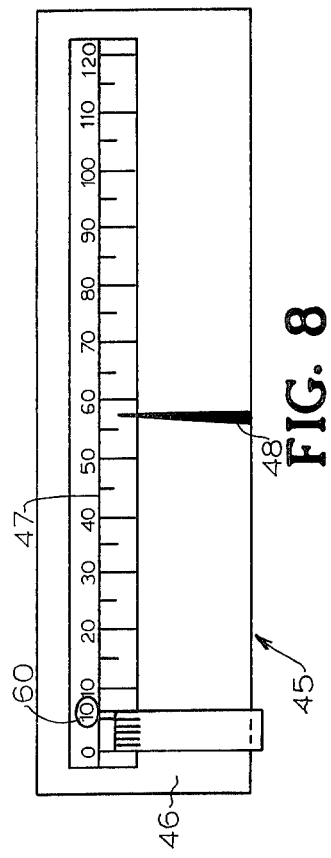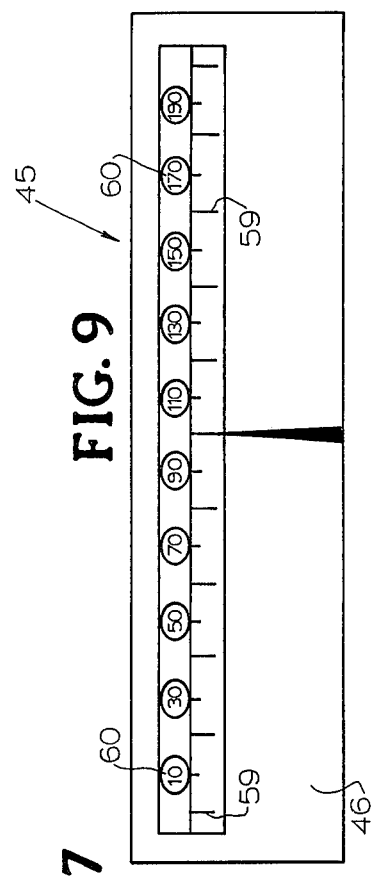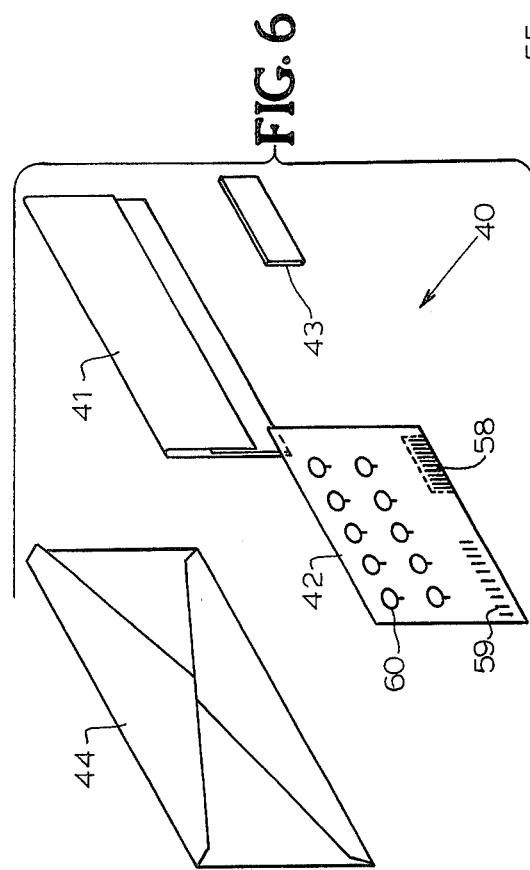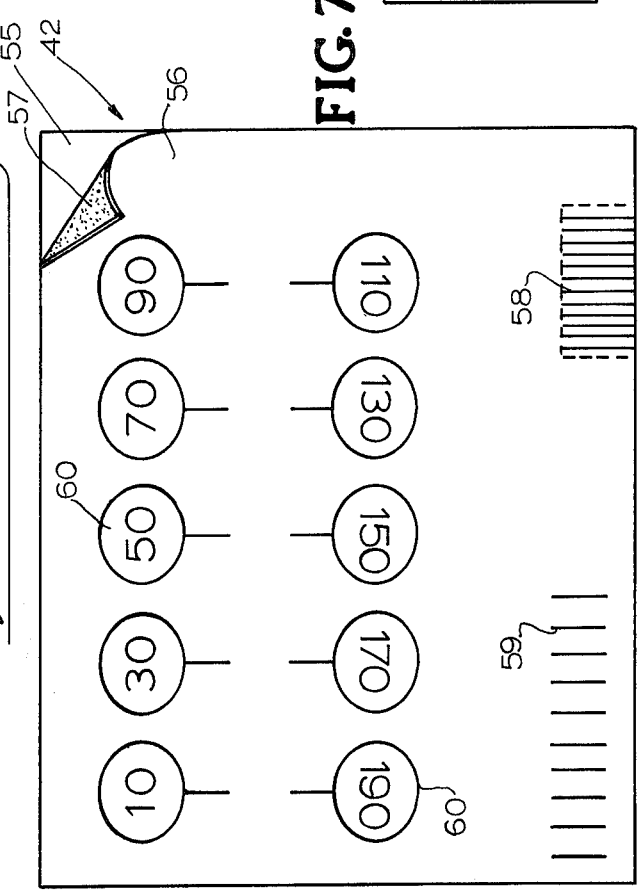

SPEEDOMETER SCALE CONVERSION KIT AND METHOD

BACKGROUND OF THE INVENTION

1. FIELD OF THE INVENTION:

This invention relates to aids and methods useful in converting miles per hour readings into kilometers per hour readings.

2. DESCRIPTION OF THE PRIOR ART:

Barring changes in the plans of the Federal Highway Administration, conversion to the metric system on the highways of the United States will come about in the near future. Since highways signs will be changed from miles per hour to kilometers per hour, the motorist will need some quick and accurate means for converting his car speedometer from miles per hour readings to kilometers per hour. It is expected that after the changeover, new cars will show speedometer readings in both miles and kilometers per hour until the new system is implemented. Thereafter, it is expected that only kilometer per hour speedometers will be produced. Those who own older cars will thus be faced with an immediate conversion problem.

One approach thus far has been to have a conversion chart positioned adjacent the transparent speedometer front cover so that the driver can view his car speed on the mile per hour scale and quickly look at the adjacent chart to obtain his kilometer per hour conversion reading. This approach, however, is distracting to the driver and requires his removing his eyes and attention from the highway and traffic.

Another approach conceived is that of glueing little arrows to the speedometer front thereby giving three or four converted readings. These readings would mark the most widely employed speed limits, e.g., 55 m.p.h.; 45 m.p.h.; 35 m.p.h.; and 25 m.p.h. Such a system of marking would give the driver a general feeling about the speed he is driving. This is an improvement over the previous approach, however, it does not give the driver a constant reading which is most favorable.

British Pat. No. 1,251,425 teaches a scale conversion sheet which is applied to the speedometer front cover by adhesion. The transparent nature of the sheet enables the speedometer to be read in either the original or the new kilometer scale without mathematical conversion. The sheet is of a size and shape corresponding to the transparent front of a particular speedometer and has clear adhesive provided on one surface protected by a removable backing sheet. Even this approach is deemed impractical however considering the number of different shapes involved in automobile speedometers on today's market.

With the foregoing in mind, there is obviously an immediate need for a simple, interchangeable, inexpensive kit and method for converting mile per hour speedometer readings to kilometer per hour readings.

SUMMARY OF THE INVENTION

The speedometer scale conversion apparatus and method of the present invention utilizes a kit comprising an instructional sheet which offers a step-by-step method of employment of the kit's components; a decal card which has markings peelable therefrom and with integral adhesive backing; and a cardboard strip which can be formed into a ten kilometer gauge. The decal markings correspond to kilometer per hour graduations and are peeled from the decal cord. The gauge made from the cardboard strip is used to mark off ten kilometer spacings on the transparent front face of the speedometer prior to application of the kilometer decal markings from the decal card.

DESCRIPTION OF THE DRAWINGS

FIG. 1 is an exploded view of the components comprising the kit of the present invention.

FIG. 2 illustrates in plan view one of the decal cards used with the invention kit and which is adapted particularly for round face scale speedometers.

FIG. 3 is a view illustrating step-by-step how the cardboard strip is formed into a ten kilometer gauge for use with round face speedometers.

FIG. 4 is a view illustrating how the 10 kilometer gauge is used to mark off ten kilometer spacings on the front of the round face scale speedometer.

FIG. 5 is a plan view of the front of the round face speedometer once the conversion operation is completed with the conventional m.p.h. markings removed for clarity.

FIG. 6 is an exploded view of the components of the kit of the invention according to the second embodiment.

FIG. 7 is a plan view of an alternative decal card used with the invention kit and which is adapted particularly for linear face scale speedometers.

FIG. 8 is a plan view illustrating how the ten kilometer gauge is used to mark off ten kilometer spacings on the front of a linear scale speedometer.

FIG. 9 is a plan view of the linear face speedometer front once the conversion operation is completed with the conventional m.p.h. markings removed for clarity.

DESCRIPTION OF THE PREFERRED EMBODIMENT

Turning now to a description of the speedometer scale conversion kit 10 and the method employed, FIG. 1 illustrates the components which make up kit 10. Kit 10 is composed of an instruction sheet 11, a decal cord 12 and a cardboard strip 13. A suitable container or packet 14 is employed to hold the components 11, 12 and 13 of kit 10 for convenient purchase and use by the purchaser thereby providing in one package all of the necessary material for converting a conventional mile per hour speedometer into a metric kilometer per hour speedometer. According to the invention, kit 10 is used with a round face scale speedometer 15 having a transparent, e.g., glass, front 16 permitting viewing of its graduation scale 17 in miles per hour as the dial indicator 18 moves to the scale marking corresponding to the speed of the vehicle. In addition to kit 10, a pair of scissors and a marking pen or pencil will be needed to carry out the method of the present invention.

Description will now turn to a detailed description of decal card 12 and the other components and to the application of the decals to transparent front 16 of speedometer 15. Decal card 12 is made up of a backing card 25 and a laminar sheet of transparent material 26 with an adhesive backing 27. Sheet 26 has peelable graduated markings decal 28 imprinted thereon along with peelable stripes 29 and peelable numbers 30. By "peelable" is meant that the respective indicia and numbers can be separately and readily peeled off the back card 25 for adhering to the speedometer front 16.

The method described on sheet 11 instructs the user as follows:

Step 1: Peel off and apply the graduated markings decal 28 to the end of cardboard strip 13 to provide the kilometer gauge. Decal 28 is pre-punched so that it will peel from card 25 and retain its adhesive backing 27 which enables decal 28 to be adhered on strip 13.

Step 2: The user seats himself behind the steering wheel of the vehicle so as to view the speedometer 15 when driving.

Step 3: Measure the distance between 60 and 66 miles per hour with the strip 13 now forming the kilometer gauge of step 1. Mark the distance between 60 and 66 miles per hour with a pen or pencil below the graduated markings decal 28 on strip 13 (see FIG. 3).

Step 4: Cut off the excess portion of the gauge, that portion extending beyond the 66 mile per hour mark placed in step 3. The width of the strip 13 now represents 6 miles per hour or 10 kilometers per hour on the particular speedometer 15.

Step 5: Place the left edge of the gauge on the 0 mile per hour mark. Use the right side of the gauge to determine the proper placement of the 10 kilometer per hour number on front 16 of speedometer 15 (see FIG. 4).

Step 6: Peel off from card 25 and place the remaining numbers 30, from 30 to 190, and the stripe 29 by measuring from each previously placed decal stripe 29 or number 30 with the 10 kilometer cardboard strip 13. Each number 30 should be followed by a stripe 29 representing the even 10 kilometer readings until the conversion operation is completed (see FIG. 5).

Step 7: Check for accuracy. The 50 kilometer number on the round scale should be exactly on top of the old 30 miles per hour mark and the 100 kilometer stripe should be exactly on top of the old 60 mile per hour mark. The numbers 30 and stripes 29 should appear evenly spaced.

If speedometer 15 does not start at 0 miles per hour, the 50 kilometer number should be placed to coincide with the old 30 miles per hour mark and measurements should be taken forward and backward from this number to place the remaining decals. If speedometer 15 does not register a maximum of 120 miles per hour, some of the numbers 30 and stripes 29 will be excess in the embodiment illustrated.

Turning now to a description of a second embodiment of the present invention suited to a linear type speedometer, conversion kit 40 is composed of an instruction sheet 41, a decal card 42 and a cardboard strip 43. A suitable container or packet 44 is employed to hold components 41, 42 and 43 of kit 40 for convenient purchase and use by the purchaser thereby providing in one package all of the necessary material for converting a conventional linear-type mile per hour speedometer into a metric kilometer per hour speedometer. According to this embodiment of the invention, kit 40 is used with a linear face scale speedometer 45 having a transparent, e.g., glass, front 46 permitting viewing of its graduation scale 47 in miles per hour as the dial indicator 48 moves to the scale marking corresponding to the speed of the vehicle. As with the first embodiment converting a round scale, will require, in addition to kit 40, a pair of scissors and a marking pen or pencil to carry out the method of the second embodiment.

Description will now turn to a detailed description of decal card 42 and the other components and to the application of the decals to the transparent front 46 of speedometer 45. As with the first embodiment, decal card 42 is made up of a backing card 55 and a laminar sheet of transparent material 56 with an adhesive backing 57. Sheet 56 has peelable graduated markings decal 58 imprinted thereon along with peelable stripes 59 and peelable numbers 60.

The method on instruction sheet 41 instructs the user with respect to the second embodiment as follows:

Step 1: Peel off and apply the graduated markings decal 58 to the end of cardboard strip 43 to provide a kilometer gauge. Decal 58 is pre-punched so that it will peel from card 55 and retain its adhesive backing 57 which enables decals 58 to be adhered on strip 43.

Step 2: The user seats himself behind the steering wheel of the vehicle so as to view the speedometer as when driving.

Step 3: Measure the distance between 60 and 66 miles per hour with the strip 43 now forming the kilometer gauge of step 1. Mark the distance between 60 and 66 miles per hour with a pen or pencil below the graduated markings decal 58 on strip 43.

Step 4: Cut off the excess portion of the gauge, that portion extending beyong the 66 mile per hour mark placed in step 3. The width of the strip 43 now represents 6 miles per hour or 10 kilometers per hour on the particular linear scale speedometer 45.

Step 5: Place the left edge of the gauge on the 0 mile per hour mark. Use the right side of the gauge to determine the proper placement of the 10 kilometer per hour number on transparent front 46 of speedometer 45 (see FIG. 8).

Step 6: Peel off from card 42 and place the remaining numbers 60, from 30 to 190, by measuring from each previously placed decal stripe 59 or number 60 with the 10 kilometer cardboard strip 43. Similar to the first embodiment, each number 60 should be followed by a stripe 59 representing the even kilometer readings until the conversion operation is complete (see FIG. 8).

Step 7: Check for accuracy. The 50 kilometer number on the linear scale should coincide with the old 30 miles per hour mark and the 100 kilometer stripe should coincide with the old 60 miler per hour mark. The numbers 60 and stripes 59 should appear evenly spaced.

If speedometer 45 does not start at 0 miles per hour, the 50 kilometer number should be placed to coincide with the old 30 miler per hour mark and measurements should be taken forward and backward from this number to place the remaining decals. If speedometer 45 does not register a maximum of 120 miles per hour, some of the numbers 60 and stripes 59 will be excess in the second embodiment for the linear scale as with the first embodiment for the round scale.

In summary, the kit and method of the present invention provides a simple, interchangeable, inexpensive kit and method for converting mile per hour speedometer readings to kilometer per hour readings for a wide range of types of speedometers.

What is claimed is:

1. A kit for converting a basic speedometer scale calibrated in terms of miles per hour to a scale calibrated in terms of kilometers per hour including instructions for use and means for packaging the components by which the conversion is made, said conversion components comprising:

(a) a laminar sheet of transparent material being provided with an adhesive on one surface protected by a backing sheet and having indicia imprinted on the opposing surface, wherein said indicia consists of:

(i) a graduated scale of measuring markings with said scale being pre-punched in a manner such that it is separately removable from said laminar sheet and backing as a unit;

(ii) a series of numerals representing kilometers per hour, with said numerals being pre-punched to permit peeling from said backing sheet; and (iii) a plurality of heavily darkened stripes likewise pre-punched so that they are peelable from said backing sheet; and (b) a rectangular carboard strip being adapted to receive said graduated scale across its width at one end thereof in adhering relationship.

2. The kit in accordance with claim 1 wherein said numerals and said stripes are printed on said laminar sheet in a circular configuration.

3. The kit in accordance with claim 1 wherein said numerals and said stripes are printed on said laminar sheet in a linear configuration.

4. A method for converting a speedometer scale calibrated in terms of miles per hour to a scale calibrated in terms of kilometers per hour, said method comprising the following steps:

(a) providing a laminar sheet of transparent mateiral with an adhesive on its bottom surface protected by a backing sheet and having indicia printed on its top surface, with said indicia being separately removable by peeling from the backing sheet, and wherein said indicia includes a scale of graduated markings, a plurality of heavily darkened stripes and a progression of numbers ranging between 10 and 190 with the difference between each number in the progession being 20;

(b) removing said scale of graduated markings from said laminar sheet and causing it to adhere across the width of a cardboard strip at one end thereof to provide a measuring gauge;

(c) measuring the distance between 60 and 66 miles per hour on the speedometer to be converted with said gauge and cutting the cardboard strip to a width corresponding to this distance so as to obtain a gauge whose width represents 10 kilometers per hour;

(d) placing the left edge of the gauge on the 0 mile per hour mark of said speedometer and thereafter placing the numeral 10, after removal from said laminar sheet, onto the speedometer at a position corresponding to the right edge of said gauge;

(e) moving the left edge of said gauge to a position corresponding to the position of said numeral 10 and thereafter placing a stripe, after removal from said laminar sheet, onto the speedometer at a position corresponding to the right edge of said gauge; and (f) repeating the sequence of (d) and (e) above to position the remaining numerals from 30 to 190 in progression onto the said speedometer with each numeral being followed by the positioning of a stripe.

* * * * *

UNITED STATES PATENT OFFICE
CERTIFICATE OF CORRECTION

Patent No. 4,092,191　　　　　　　　　Dated May 30, 1978

Inventor(s) Thomas L. Jones

It is certified that error appears in the above-identified patent and that said Letters Patent are hereby corrected as shown below:

Col. 2, line 41, "cord" should be --card--

Col. 4, line 20, "beyong" should be --beyond--.

Col. 4, line 46, "miler" should be --miles--.

Col. 5, line 11 "carboard" should be --cardboard--.

Col. 5, line 24, "mateiral" should be --material--.

Signed and Sealed this

Twenty-first Day of November 1978

[SEAL]

Attest:

RUTH C. MASON　　　　　　　　　DONALD W. BANNER
Attesting Officer　　　　　　Commissioner of Patents and Trademarks